UNITED STATES PATENT OFFICE.

CHARLES S. BRADLEY, OF YONKERS, ASSIGNOR TO THE BRADLEY ELECTRIC POWER COMPANY, OF NEW YORK, N. Y.

ELECTRICAL CONDUCTING MATERIAL.

SPECIFICATION forming part of Letters Patent No. 312,803, dated February 24, 1885.

Application filed November 11, 1884. (No specimens.)

*To all whom it may concern:*

Be it known that I, CHARLES S. BRADLEY, a citizen of the United States, residing at Yonkers, in the county of Westchester and State of New York, have invented a new and useful composition of matter, being a substance which is a conductor of electricity, impervious to liquids or gases, unaffected by water, solutions of salts, acids, &c., and is at the same time a material well adapted to being rolled, cut, pressed, molded, or otherwise worked into any desired form, of which invention the following is a specification.

My composition consists of gas-retort carbon, or its equivalent, and gutta-percha or india-rubber.

The ingredients of the composition may be used in various proportions, and various methods of mixing them may be employed; but I have found that excellent results are obtained in the following way: I take from one to ten parts of finely-ground gas-retort carbon, and one part of gutta-percha or india-rubber, and thoroughly incorporate these ingredients by rolling in the well-known manner in which gutta-percha and rubber are usually worked. The mixture having been properly made, the resulting material may then be pressed into the required form in suitable molds, it being made plastic for this purpose by slightly heating it.

In order to harden and strengthen the material, it may be vulcanized by any of the well-known processes employed for gutta-percha and rubber. For example, sulphur or some of the substances containing sulphur that are commonly employed in vulcanizing may be added to the carbon and gutta-percha or rubber when they are mixed together, and the subsequent heat and pressure to which the material is subjected in order to bring it into the desired form will also vulcanize it.

Instead of using sulphur in the solid state, the vulcanization may be effected by the use of liquids containing sulphur—such as chloride of sulphur, &c. For some purposes, to be hereinafter pointed out, I prefer to vulcanize my material with bromine, which is a well-known vulcanizing agent, instead of sulphur. The bromine may be put in with the other ingredients when they are mixed, or it may be applied in solution or in the vapor form. In fact any of the methods of vulcanizing commonly made use of in the arts may be adopted. The percentage of carbon in the material of course determines its electrical conductivity, the greater the percentage of carbon the greater, of course, the conductivity; but since the gutta-percha or rubber is the cement or binder which holds the particles of carbon together, it is not advisable to attempt to increase the conductivity by increasing the proportion of carbon, and consequently decreasing the proportion of binder, beyond a certain limit, because beyond that point the material becomes brittle, crumbly, and porous, so that it is no longer impervious to liquids and gases. The relative proportions of carbon and gutta-percha or rubber will depend upon the conditions in each particular case, varying from about equal parts of each to eight or ten parts of carbon to one of gutta-percha or rubber. The mean between these limits—i. e., about three parts of carbon to one of gutta-percha or rubber—will be found to be a very good mixture for general purposes, where the maximum strength and electrical conductivity compatible with each other are required.

The herein-described electrical conducting material possesses many decided advantages over the ordinary baked carbon, which is used in the form of plates and sticks in primary and secondary batteries, as well as for other electrical purposes. First, my material is impervious to liquids and gases, hence it can be used as a vessel or receptacle to contain them, which in many cases is a great convenience. The imperviousness of my material also prevents liquids from creeping up by capillary action and corroding the metallic connections, which causes so much trouble in the case of porous carbon electrodes; second, the material can be softened by slightly heating it, and while in that condition it may be rolled, pressed, or molded into any desired shape. In the same way two pieces may be united so as to make an absolutely perfect joint; third, the material is strong and tough, especially when vulcanized, whereas the ordinary baked carbon is weak and brittle; fourth, the material will not disintegrate under the action of liquids as ordinary carbon does.

It is well known that ordinary carbon is particularly apt to disintegrate when it is employed as an electrode in electrolysis, because the carbon being porous the metal or gas, as the case may be, set free by the electrolytic action forms to a certain extent beneath the surface of the electrode, and acts mechanically to force off particles of carbon; but my material, being non-porous, is free from this trouble.

The herein-described material is useful for a great many electrical purposes; but I have found it to be especially applicable in cases where a conductor of electricity is required which is exposed to corrosive liquids or gases, conditions under which no metals, except certain very expensive ones—such as platinum—can be employed. One of the substances which compose the material is carbon, which at temperatures below a red heat is as little affected by chemical action as any known substance; and the other ingredient is gutta-percha, (which is preferable to india-rubber for resisting chemical action,) which is used for making vessels to hold the strongest acids.

In a secondary battery which I have invented, and described in an application filed April 19, 1884, Serial No. 128,482, electrodes are required which will withstand the action of bromine which is set free when the battery is charged. I have used for this purpose electrodes composed of the material which is the subject of the present application and found them to be perfectly satisfactory; but I do not claim the application of this material to the above battery in the present case, as I intend making it the subject of future applications. Where my material is used in the presence of bromine the gutta-percha is of course vulcanized with bromine.

I am aware that it is old in the arts to mix clay, chalk, sand, and like substances with gutta-percha and rubber in order to make a harder and cheaper material; but this is essentially different from my invention, because all the ingredients and the resulting compositions are non-conductors of electricity.

I am also aware that a mixture of graphite and india-rubber has been used for packing and for journals; but this, strange to say, is not a conductor of electricity either. For example, a mixture consisting of three parts, by weight, of graphite and one of gutta-percha has a specific resistance over a million times as great as that of graphite alone. This apparent anomaly is due to the fact that graphite is soft, and each particle of it becomes coated with a film of rubber, which is an electrical insulator, and prevents the particles from making contact, whereas gas-retort carbon is hard and sharp. It has a grit, and the points of the particles cut through the rubber and touch each other, making electrical connection.

A mixture of gas carbon and gutta-percha of a similar composition to the graphite mixture referred to above (three parts of carbon to one of gutta-percha) has a specific resistance only a few times greater than that of the gas carbon alone. Thus graphite, which is essentially non-gritty in its nature, being a lubricator, makes, when mixed with gutta-percha or rubber in any proportions that can be practically used, a non-conductor of electricity, while gas carbon, coke, or other carbon which is hard and gritty, produce, when mixed with gutta-percha or rubber, a conducting material having the useful properties and advantages hereinbefore set forth.

Having thus described my invention, what I claim as new, and desire to secure by Letters Patent, is—

1. The herein-described electrical conducting material, consisting of gas-retort carbon or other carbon which has grit, and gutta-percha or india-rubber.

2. The herein-described electrical conducting material, consisting of gas-retort carbon or other carbon which has grit, and gutta-percha or india-rubber, said gutta-percha or india-rubber being vulcanized.

3. The herein-described electrical conducting material, consisting of gas-retort carbon or other carbon which has grit, and gutta-percha or india-rubber, said gutta-percha or india-rubber being vulcanized with bromine.

4. The herein-described electrical conducting material, consisting of ground gas-retort carbon or other carbon which has grit, and gutta-percha or india-rubber, said ingredients being mixed together by rolling.

Signed this 10th day of November, 1884, in the presence of two subscribing witnesses.

CHARLES S. BRADLEY.

Witnesses:
CHARLES G. CURTIS,
FRANCIS B. CROCKER.